(12) United States Patent
Gregory

(10) Patent No.: US 6,783,598 B2
(45) Date of Patent: Aug. 31, 2004

(54) MOISTURE BARRIER SEALING OF FIBER OPTIC COILS

(75) Inventor: Peter Gregory, North Attleboro, MA (US)

(73) Assignee: Fibersense Technology Corp., Canton, MA (US)

( * ) Notice: Subject to any disclaimer, the term of this patent is extended or adjusted under 35 U.S.C. 154(b) by 141 days.

(21) Appl. No.: 10/219,412

(22) Filed: Aug. 15, 2002

(65) Prior Publication Data

US 2004/0086636 A1 May 6, 2004

(51) Int. Cl.[7] .............................................. C23C 16/00
(52) U.S. Cl. .................. 118/720; 118/50; 118/500; 118/620; 118/728; 427/162; 427/166; 427/255.12; 427/294
(58) Field of Search .......................... 118/720, 50, 500, 118/620, 728; 427/162, 166, 255.12, 294

Primary Examiner—Bernard Pianalto

(57) ABSTRACT

A method of applying a moisture barrier seal to a fiber optic coil includes mounting a fiber optic coil in a vacuum deposition chamber, so as to expose a large exterior surface area of the fiber optic coil to an interior portion of the deposition chamber. The method further includes reducing the air pressure within the chamber to a value that is less than ambient pressure outside of the chamber. The method further includes introducing a vapor form of a non-porous material, preferably parylene, into the chamber. The vapor form of the non-porous material changes into a solid state upon contact with the fiber optic coil, so as to form a conformal coat on the fiber optic coil.

15 Claims, 2 Drawing Sheets

MOISTURE BARRIER SEALING OF FIBER OPTIC COILS

CROSS-REFERENCE TO RELATED APPLICATIONS

Not Applicable.

STATEMENT REGARDING FEDERALLY SPONSORED RESEARCH

Not Applicable.

REFERENCE TO MICROFICHE APPENDIX

Not Applicable.

BACKGROUND OF THE INVENTION

The present invention relates to fiber optic gyroscopes (hereinafter referred to as "FOG"), and more particularly, to FOG coils constructed and arranged to reduce the rate of absorption of ambient moisture.

It is well known that moisture can degrade the performance and reliability of optical fibers. Micro-cracks in the glass fiber can propagate in the presence of ambient moisture which in turn can change the optical properties of the fiber and potentially lead to premature failure. The effects of moisture depends on many factors, including environmental conditions, the nature of the fiber manufacturing process, etc. Since the amount of moisture can change with environmental conditions (e.g., temperature), the optical properties of the fiber can change, often unpredictably, as a function of those conditions.

Fiber manufacturers typically apply an acrylate (or other similar polymeric material) protective coating directly to the outer surface of the glass fiber to mitigate the effects of ambient moisture. Such a coating creates a barrier to moisture, provides some level of abrasion resistance and permits handling since bare fiber is very fragile. While the coating may environmentally protect the fiber, the coating itself may absorb a significant amount of moisture. This phenomenon has been observed during bake-out procedures, i.e., when the fiber is subjected to controlled high temperature environments, for an extended amount of time. During bake-out procedures, coated optical fibers experience a significant weight change (e.g., 12 percent or more), and hence a diametrical change, implying that the coating surrenders a significant amount of captured moisture while in the high temperature environment.

A coil of optical fiber is a critical component in an Interferometric Fiber Optic Gyroscope (IFOG, or more simply, FOG). A FOG is a device used to measure the rate of rotation of a vehicle or other platform to which the FOG is attached. The FOG typically includes a coil of optical fiber disposed about an axis of rotation. A light source transmits light into each end of the optical fiber, so that two light transmissions propagate through the optical fiber in counter-rotating directions. Detection circuitry receives the light transmissions as they emerge from the ends of the optical fiber and measures the relative phase relationship of the light. The phase relationship of the two light transmissions is related to the angular rotation of the FOG coil about the axis of rotation, and may be used to derive an output signal that is indicative of the rate of rotation of the FOG coil.

An important parameter associated with a FOG, commonly referred to as the "scale factor," defines and quantifies the relationship between the actual rate of rotation of the FOG to the output signal of the FOG device (e.g., number of output pulses per arc-second of rotation). Variations in the FOG scale factor tend to decrease the accuracy of the FOG. The optical diameter of the fiber optic coil directly influences the scale factor of the FOG, so any external influences that could affect the optical diameter will also affect the scale factor. The optical diameter is closely related to the physical diameter of the coil, so any change in the physical diameter of the coil can effect the scale factor of the FOG. Therefore, moisture absorption by the fiber jacket directly affects the overall fiber diameter and hence the resultant scale factor of the FOG.

Epoxy materials are often applied about and between layers of optical fibers in the coils to provide physical stability of the winding layers, and to maintain the coil geometry over environmental stresses. Such epoxy materials are known to be amorphous with inhomogeneities that are commensurate with the size of water molecules, so as to permit the transport of water molecules through capillary action. These epoxy materials are thus hygroscopic, and if the stabilizing epoxy material absorbs a significant amount of moisture, the epoxy material can expand and/or deform, thus changing the coil geometry and affecting the performance of the FOG.

SUMMARY OF THE INVENTION

In one aspect, a method of applying a moisture barrier seal to a fiber optic coil comprises mounting a fiber optic coil in a vacuum deposition chamber, so as to expose a large exterior surface area of the fiber optic coil to an interior portion of the deposition chamber. The method further includes reducing the air pressure within the chamber to a value that is less than ambient pressure outside of the chamber. The method further includes introducing a vapor form of a non-porous material into the chamber. The vapor form of the non-porous material changes into a solid state upon contact with the fiber optic coil, so as to form a conformal coat on the fiber optic coil.

In one embodiment, the method further includes evacuating at least some of the air within the chamber (i.e., removing air from inside the chamber) so as to reduce the air pressure within the chamber.

In another embodiment, the method further includes heating the non-porous material until it converts into a gaseous, vapor form.

In another embodiment, the method further includes introducing parylene vapor into the vacuum deposition chamber.

In another embodiment, the method further includes heating a predetermined quantity of parylene material until the parylene material transforms into a gaseous, parylene vapor.

In another embodiment, the method further includes reducing the air pressure within the chamber to a predetermined value less than the ambient air pressure, wherein the predetermined value is a nominal vacuum deposition pressure.

In another aspect, a system for applying a moisture barrier seal to a fiber optic coil comprises mounting means for mounting a fiber optic coil in a vacuum deposition chamber, so as to expose a large exterior surface area of the fiber optic coil to an interior portion of the deposition chamber. The system further includes means for reducing air pressure within the chamber to a value less than ambient pressure outside of the chamber. The system also includes means for introducing a vapor form of a non-porous material into the chamber. The vapor form of the non-porous material changes into a solid state upon contact with the fiber optic coil, so as to form a conformal coat on the fiber optic coil.

In one embodiment of the system, the mounting means further includes mounting provisions constructed and arranged so as to expose a maximum amount of the exterior surface of the fiber optic coil to an environment within the deposition chamber.

In another embodiment of the system, the means for reducing air pressure further includes a vacuum pump for removing at least some air from within the deposition chamber.

In another embodiment, the vacuum pump reduces air pressure within the chamber to a predetermined value less than ambient pressure. The predetermined value is a nominal vacuum deposition pressure for applying the non-porous material vapor to the fiber coil.

In another embodiment, the means for introducing a vapor form of a non-porous material further includes a vapor generator for heating a predetermined amount of the non-porous material until the non-porous material sublimes into a vapor form. In one embodiment, the non-porous material includes parylene.

In another embodiment, the fiber optic coil remains in the chamber for a predetermined amount of time, surrounded by the vapor form of the non-porous material at the air pressure value less than ambient pressure.

In another aspect, a system for applying a moisture barrier seal to a fiber optic coil comprises a deposition chamber, a vacuum pump and a vapor generator. The deposition chamber has an access hatch for transferring the fiber optic coil into or out of the deposition chamber, a vacuum port for transferring air into or out of the deposition chamber, and an input port for transferring deposition material into or out of the deposition chamber. The vacuum pump is attached to the vacuum port, and pumps air out of the deposition chamber, so as to reduce air pressure within the chamber to a value less than ambient pressure outside of the chamber. The vapor generator is attached to the input port, and introduces a vapor form of a non-porous material into the chamber. The vapor form of the non-porous material changes into a solid state form upon contact with the fiber optic coil, so as to create a conformal coat on the fiber optic coil.

In another embodiment of the invention, the deposition chamber further includes mounting provisions for mounting the fiber optic coil within the deposition chamber. The mounting provisions may include a bracket, pedestal or other similar assembly known in the art for securing the fiber optic coil. The mounting provisions are constructed and arranged so as to expose a large exterior surface of the fiber optic coil to an interior portion of the deposition chamber.

In another embodiment of the invention, the vacuum pump reduces air pressure within the chamber to a predetermined value that is less than ambient pressure. This predetermined value of pressure in the chamber is a optimal vacuum deposition pressure, i.e., a pressure that allows the best deposition of the non-porous material on the exterior surface of the optical fiber coil, without damaging the coil.

In another embodiment, the vapor generator heats a predetermined amount of the non-porous material until the non-porous material sublimes into a vapor form. In one embodiment, the non-porous material includes parylene.

In another embodiment of the system, the fiber optic coil remains in the chamber for a predetermined amount of time, surrounded by the vapor form of the non-porous material at the air pressure value less than ambient pressure. Although material quantity and process time defines the thickness and hence performance of the coating as a moisture barrier, it is important that the coating is not too thick. Thick coatings might adversely affect the performance of the FOG due to differential thermal expansions that can induce stress on the optical fiber.

BRIEF DESCRIPTION OF DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENTS

Figure 1:
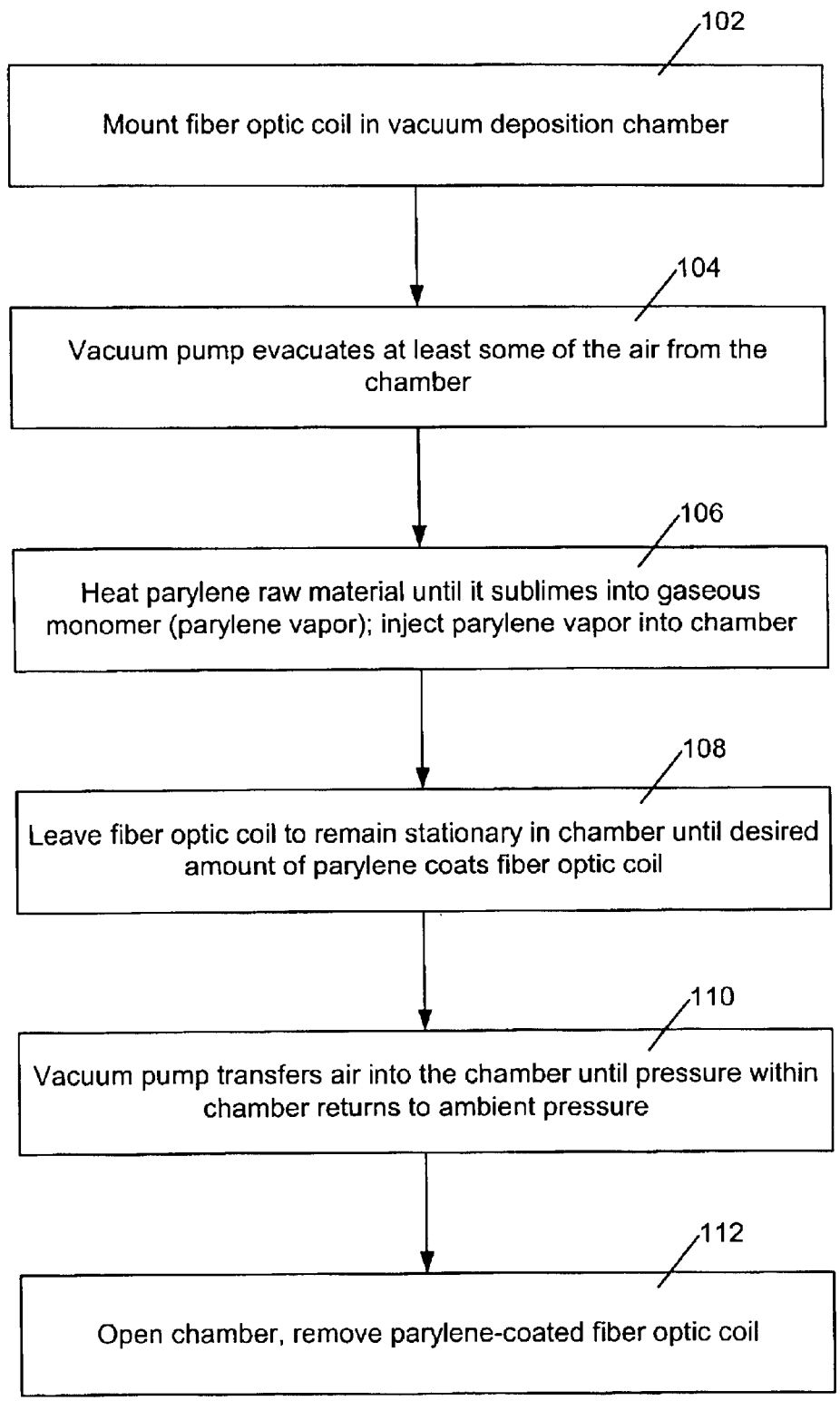
FIG. 1 shows a flow diagram 100 describing one embodiment a method for applying a moisture barrier seal to a fiber optic coil.

In general, a method of applying a moisture barrier seal to a fiber optic coil includes subjecting the coil to a controlled, low pressure environment (i.e., a vacuum environment) and introducing a non-porous material, preferably in vapor form, to the low pressure environment along with the coil. In one embodiment, the non-porous material includes parylene, although other similar materials and thin compliant films may also be used. This method allows vacuum deposition of the non-porous material on the fiber optic coil. FIG. 1 shows a flow diagram 100 describing one embodiment a method for applying a moisture barrier seal to a fiber optic coil. In the first step 102 of this method, a FOG coil assembly that has been wound via any of several coil winding techniques known to those in the art (see, for example, U.S. patent application Ser. No. 10/003,914, entitled System and Method of Winding a FOG Coil) is mounted in a vacuum deposition chamber, and the vacuum chamber is sealed with the coil assembly inside the chamber. The coil is mounted in the chamber so as to expose a maximum amount of exterior surface area of the coil to the interior of the chamber. In one embodiment of the invention, the FOG coil assembly is pre-treated prior to being mounted in the chamber. In general, pre-treating may include any steps necessary to place the FOG coil in a known state. For example, if the FOG coil has been placed in storage for an extended period of time, the coil may be holding an indeterminate amount of moisture. One portion of the pre-treatment may include a "bake-out" procedure, where the coil is placed in a controlled temperature and controlled humidity environment for a predetermined amount of time, so as to fix the amount of moisture the coil holds at a know value, or at least within a known, acceptable range. The FOG coil may be subjected to other such procedures to set other various physical parameters associated with the FOG coil to known values or ranges. In the second step 104 of the method, the vacuum pump evacuates at least some of the air from the chamber, so that the pressure within the chamber is reduced to a pressure below the ambient pressure outside of the chamber (i.e., chamber pressure is negative with respect to ambient pressure). In other embodiments, the pressure within the chamber may be reduced to a pressure below ambient pressure by some other technique known in the art, for example by changing the volume or the temperature associated with the chamber. An optimal vacuum deposition pressure exists wherein air has been excluded from various cavities and other generally concave regions to allow a maximum amount of the non-porous material to reach these regions, while not generating pressure related forces that could damage the coil assembly. The actual optimal vacuum deposition pressure depends on factors such as the nature of the coil, the amount of non-porous material to be used, etc. In the third step 106 of the method, a predetermined amount of parylene material is heated until it sublimes into a gaseous monomer (i.e., parylene vapor), and the parylene vapor is injected into the chamber. In other embodiments of this method, a vapor form of other non-porous materials known in the art may be injected into the chamber instead of the parylene vapor. In the fourth step 108 of the method, the coil remains stationary in the chamber, at ambient temperature, for a predetermined amount of time after the introduction of the parylene vapor. The hot parylene vapor changes into a solid polymer state as it encounters the ambient temperature coil, so that the parylene polymer forms a conformal coat on the exterior surface of the coil. In a fifth step 110 of the method, the pressure within the chamber is allowed to return to the ambient pressure. In the sixth step 112 of the method, the chamber is opened and the parylene-coated fiber coil is removed so that the system can be readied to apply a moisture barrier coating to another fiber coil. As a result, the surface of the coil receives a relatively thin coating of parylene to function as a moisture barrier. The relatively thin barrier is important because thicker coatings, such as those resulting from a more crude "potting" procedure, may adversely affect the performance of the FOG via differential thermal expansions that can induce stress on the optical fiber.

Figure 2:
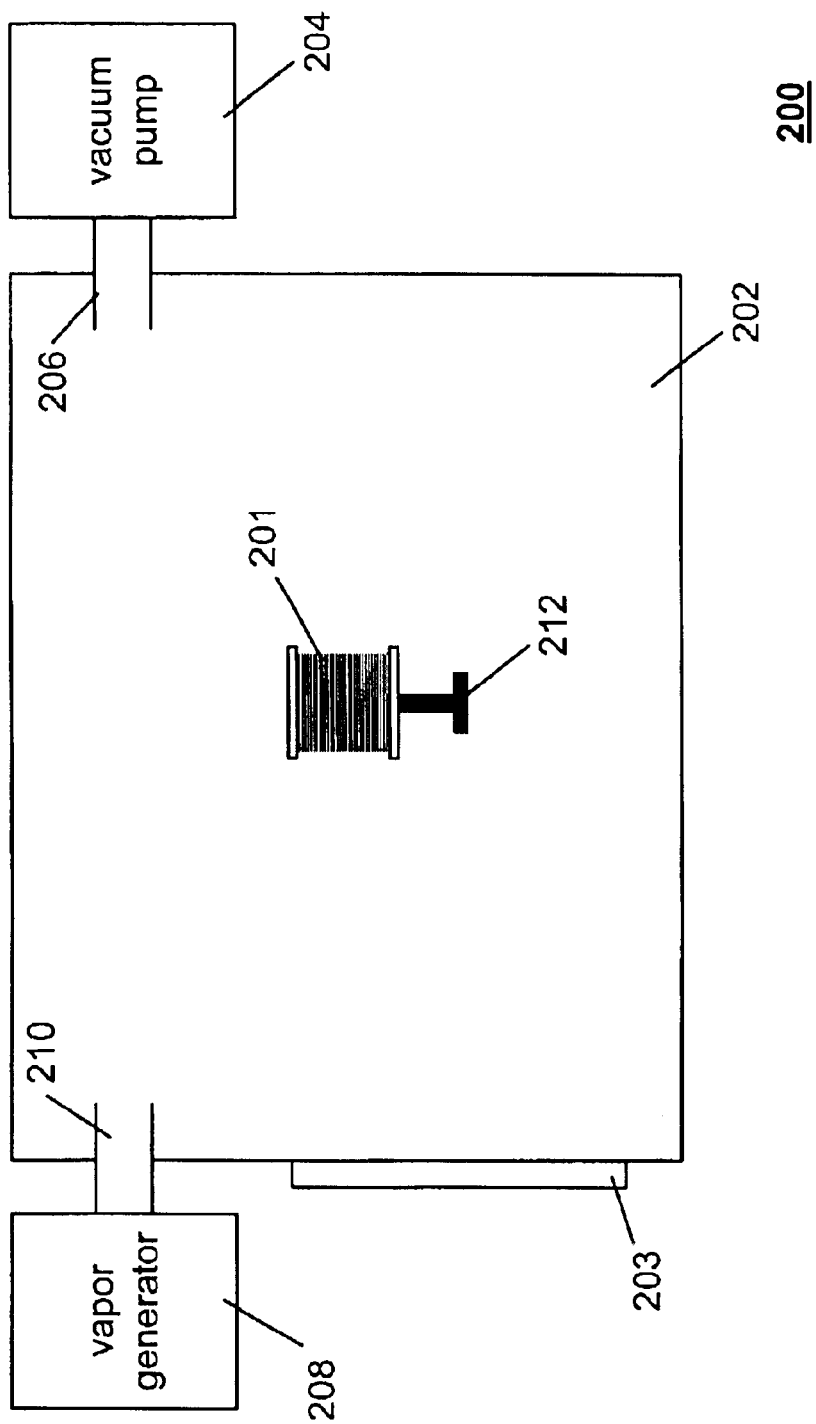
FIG. 2 shows a block diagram view of one preferred embodiment of a system 200 for applying a moisture barrier seal to a fiber optic coil.

FIG. 2 shows a block diagram view of one preferred embodiment of a system 200 for applying a moisture barrier seal to a fiber optic coil 201. The system 200 includes a deposition chamber 202 with an access hatch 203, a vacuum pump 204 attached to a vacuum port 206 on the deposition chamber 202, a vapor generator 208 attached to an input port 210 on the deposition chamber 202. The input port allows deposition materials to pass into and out of the chamber 202 when the chamber 202 has been sealed and pressure conditions within the chamber 202 remain controlled. This particular embodiment of the system 200 may be used to implement the method 100 described herein, although other similar embodiments may also be used to implement the method 100. The deposition chamber 202 includes mounting provisions 212 for securely attaching a fiber optic coil within the chamber 202. The mounting provisions may include a mounting bracket or pedestal or other similar means for securely but removably mounting the optical fiber coil within the chamber 202. The mounting provisions 212 are constructed and arranged so as to expose as much of the exterior surface of the fiber optic coil to the environment within the deposition chamber as possible. In one embodiment, the mounting provisions 212 in the deposition chamber 202 are similar to the mounting provisions that are used to secure the fiber optic coil within a FOG assembly, although other methods know in the art for securing the coil within the chamber 202 may also be used.

In operation, the fiber optic coil 201 is placed into the chamber 202 through the access hatch 203 and secured within the chamber 202 via the mounting provisions 212. The access hatch 203 is then closed so as to enclose the fiber optic coil 201 in the airtight environment of the sealed chamber 202. The vacuum pump 204 then removes air from within the sealed chamber 202, so as to create at least a partial vacuum environment within the chamber 202. The vacuum pump 204 preferably reduces the pressure within the chamber 202 to a pressure significantly below the ambient pressure outside of the chamber 202, although other pressure levels relative to ambient may also be used. Once the pressure within the chamber 202 reaches a predetermined level, the vapor generator 208 heats solid parylene raw material until the material sublimes into a gaseous monomer (i.e., parylene vapor). The vapor generator 208 introduces a predetermined amount of the hot parylene vapor into the chamber 202 via the input port 210 on the chamber 202. Other non-porous materials, similar to parylene, may also be used in other embodiments. Once the predetermined amount of parylene has been transferred to the chamber 202, the fiber optic coil 201 remains in the chamber 202 for a predetermined amount of time (referred to herein as "soak" time), surrounded by the parylene vapor at a lower than ambient pressure. The hot parylene vapor changes into a solid polymer state as it encounters the ambient temperature coil, so that the parylene polymer forms a conformal coat on the exterior surface of the coil. After the soak time, the vacuum pump 204 returns enough air to the chamber 202 to return the chamber interior to ambient pressure. The parylene-coated fiber coil 201 is removed from chamber 202 removed so that the system 200 can be readied to apply a moisture barrier coating to another fiber coil. Depending on the relative sizes of the coil and chamber, multiple coils can be coated concurrently using the method described herein.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. A system for applying a moisture barrier seal to a fiber optic coil, comprising:
   mounting means for mounting a fiber optic coil in a vacuum deposition chamber, so as to expose a large exterior surface area of the fiber optic coil to an interior portion of the deposition chamber;
   means for reducing air pressure within the chamber to a value less than ambient pressure outside of the chamber; and,
   means for introducing a vapor form of a non-porous material into the chamber, wherein the vapor form of the non-porous material changes into a solid state upon contact with the fiber optic coil, so as to form a conformal coat on the fiber optic coil.

2. A system according to claim 1, wherein the mounting means further includes mounting provisions constructed and arranged so as to expose a maximum amount of the exterior surface of the fiber optic coil to an environment within the deposition chamber.

3. A system according to claim 1, wherein means for reducing air pressure further includes a vacuum pump for removing at least some air from within the deposition chamber.

4. A system according to claim 3, wherein the vacuum pump reduces air pressure within the chamber to a predetermined value less than ambient air pressure, wherein the predetermined value is a optimal vacuum deposition pressure.

5. A system according to claim 1, wherein means for introducing a vapor form of a non-porous material further includes a vapor generator for heating a predetermined amount of the non-porous material until the non-porous material sublimes into a vapor form.

6. A system according to claim 1, wherein the non-porous material includes parylene.

7. A system according to claim 1, wherein the fiber optic coil remains in the chamber for a predetermined amount of time, surrounded by the vapor form of the non-porous material at the air pressure value less than ambient pressure.

8. A system for applying a moisture barrier seal to a fiber optic coil, comprising:

a deposition chamber having an access hatch for transferring the fiber optic coil into or out of the deposition chamber, a vacuum port for transferring air into or out of the deposition chamber, and an input port for transferring deposition material into or out of the deposition chamber;

a vacuum pump attached to the vacuum port for pumping air out of the deposition chamber, so as to reduce air pressure within the chamber to a value less than ambient pressure outside of the chamber; and, a vapor generator attached to the input port for introducing a vapor form of a non-porous material into the chamber, wherein the vapor form of the non-porous material changes into a solid state form upon contact with the fiber optic coil, so as to create a conformal coat on the fiber optic coil.

9. A system according to claim 8, wherein the deposition chamber further includes mounting provisions for mounting the fiber optic coil within the deposition chamber, so as to expose a large exterior surface of the fiber optic coil to an interior portion of the deposition chamber.

10. A system according to claim 9, wherein the mounting means further includes mounting provisions constructed and arranged so as to expose a maximum amount of the exterior surface of the fiber optic coil to an environment within the deposition chamber.

11. A system according to claim 8, wherein the vacuum pump reduces air pressure within the chamber to a predetermined value less than ambient pressure, the predetermined value being a optimal vacuum deposition pressure.

12. A system according to claim 8, wherein the vapor generator heats a predetermined amount of the non-porous material until the non-porous material sublimes into a vapor form.

13. A system according to claim 8, wherein the non-porous material includes parylene.

14. A system according to claim 8, wherein the fiber optic coil remains in the chamber for a predetermined amount of time, surrounded by the vapor form of the non-porous material at the air pressure value less than ambient pressure.

15. A system for applying a moisture barrier seal to a fiber optic coil, comprising:

a deposition chamber having an access hatch for transferring the fiber optic coil into or out of the deposition chamber, a vacuum port for transferring air into or out of the deposition chamber, an input port for transferring deposition material into or out of the deposition chamber, and mounting provisions for mounting the fiber optic coil within the deposition chamber, the mounting provisions constructed and arranged so as to expose a maximum amount of the exterior surface of the fiber optic coil to an environment within the deposition chamber;

a vacuum pump attached to the vacuum port for pumping air out of the deposition chamber, so as to reduce air pressure within the to a predetermined value less than ambient pressure, the predetermined value being a optimal vacuum deposition pressure; and, a vapor generator attached to the input port for introducing parylene vapor into the chamber, wherein the parylene vapor changes into a solid state form upon contact with the fiber optic coil, so as to create a conformal coat on the fiber optic coil;

wherein the fiber optic coil remains in the chamber for a predetermined amount of time, surrounded by the vapor form of parylene at the air pressure value less than ambient pressure.

* * * * *